H. CARBONNELLE.
MACHINE FOR THE ELECTROMECHANICAL REPRODUCTION OF DRAWINGS, WRITINGS, PHOTOGRAPHS, BLOCKS, AND THE LIKE.
APPLICATION FILED SEPT. 8, 1909.
1,024,616.
Patented Apr. 30, 1912.
3 SHEETS—SHEET 1.
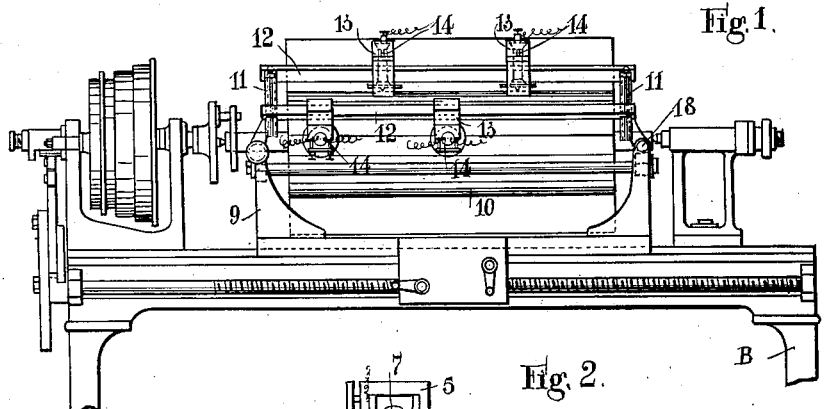
Fig. 1.
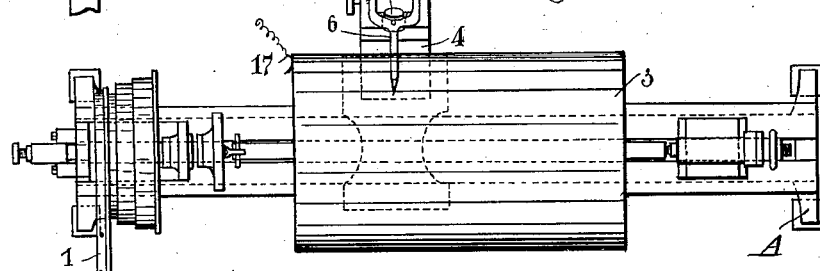
Fig. 2.
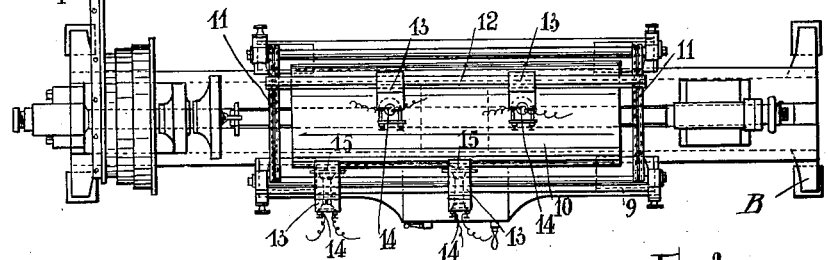
Fig. 3
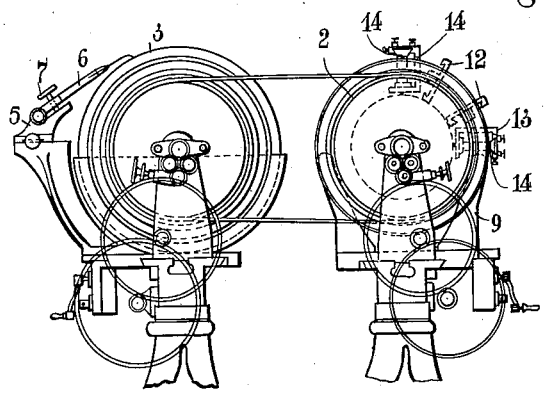
WITNESSES:
W. H. Berrigan
Alfred R. Anderson.
INVENTOR,
HENRI CARBONNELLE,
by H. van Oldeneel
Attorney.

H. CARBONNELLE.
MACHINE FOR THE ELECTROMECHANICAL REPRODUCTION OF DRAWINGS, WRITINGS, PHOTOGRAPHS, BLOCKS, AND THE LIKE.
APPLICATION FILED SEPT. 8, 1909.

1,024,616.

Patented Apr. 30, 1912.

3 SHEETS—SHEET 2.

WITNESSES:

INVENTOR,
HENRI CARBONNELLE,
by
Attorney.

H. CARBONNELLE.
MACHINE FOR THE ELECTROMECHANICAL REPRODUCTION OF DRAWINGS, WRITINGS, PHOTOGRAPHS, BLOCKS, AND THE LIKE.
APPLICATION FILED SEPT. 8, 1909.

1,024,616.

Patented Apr. 30, 1912.

3 SHEETS—SHEET 3.

WITNESSES:
W. H. Berrigan
Alfred R. Anderson.

INVENTOR,
HENRI CARBONNELLE
by H. van Dedem
ATTORNEY.

UNITED STATES PATENT OFFICE.

HENRI CARBONNELLE, OF UCCLE, BELGIUM.

MACHINE FOR THE ELECTROMECHANICAL REPRODUCTION OF DRAWINGS, WRITINGS, PHOTOGRAPHS, BLOCKS, AND THE LIKE.

1,024,616.

Specification of Letters Patent.

Patented Apr. 30, 1912.

Application filed September 8, 1909. Serial No. 516,809.

*To all whom it may concern:*

Be it known that I, HENRI CARBONNELLE, a subject of the Belgian King, and residing at Uccle, Belgium, have invented new and useful Improvements in Machines for the Electromechanical Reproduction of Drawings, Writings, Photographs, Blocks, and the Like; and I do hereby declare the following to be a full, clear, and exact description of the same.

My present invention relates to certain improvements in machines for distance transmission of or reproducing writings, drawings, blocks, photographs or the like.

Figure 4:
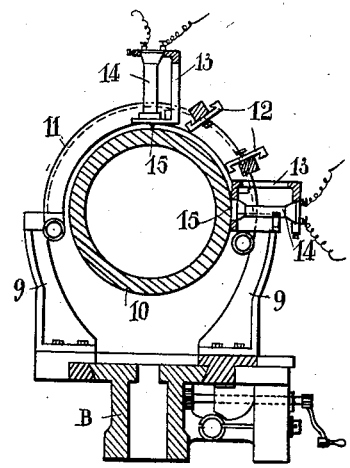
Figure 5:
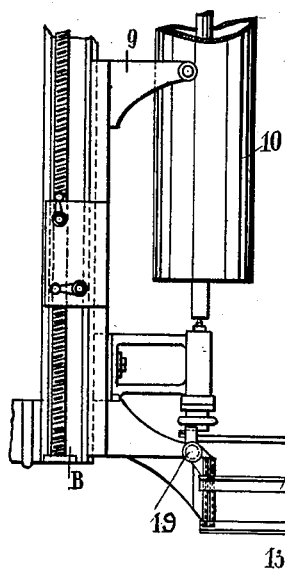
Figure 6:
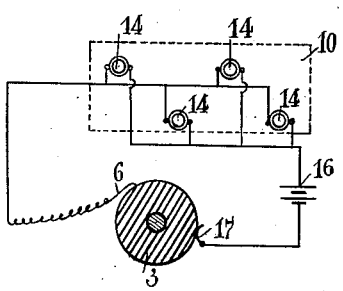
Figure 7:
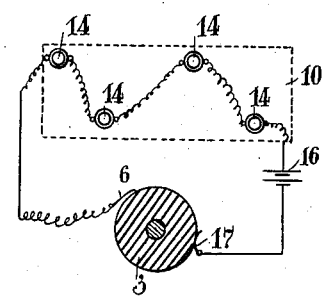
Figure 8:
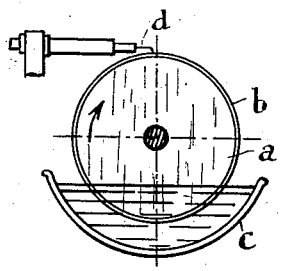
Figure 11:
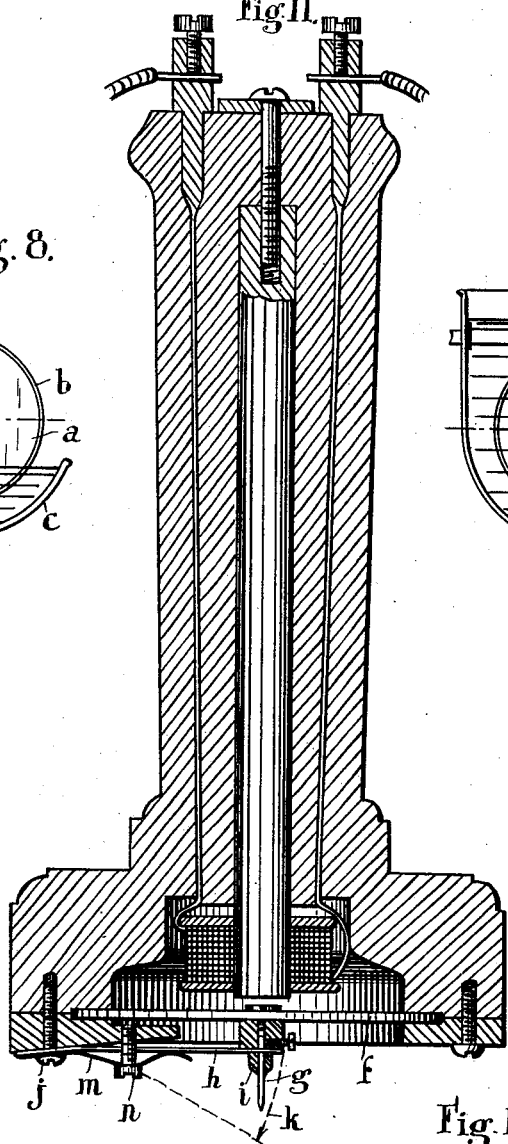
Figure 9:
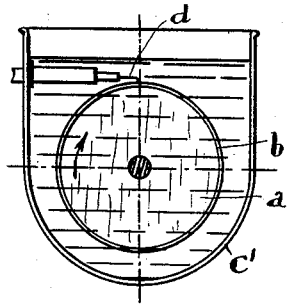
Figure 10:
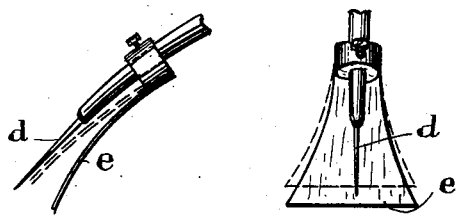

Broadly stated, the objects of my invention are:—(1) to provide a practical substantial machine for industrially reproducing blocks, drawings and the like in local circuit; (2) to provide the transmitter with means whereby the original to be reproduced is held in a clean state and constantly cleaned from dust or the like, said means preventing also sparks from being produced at the break of contact between the stylo and the original; (3) to provide the stylo of the transmitter with suitable supporting devices, whereby the lowering movements of said stylo are limited when a deeply engraved metal block is to be transmitted or reproduced; (4) to provide the flexible diaphragm of the receiving telephone with devices whereby the movements of said diaphragm and consequently of the engraver's point carried by the same may be amplified and adjusted as desired. These various improvements are illustrated by way of example on the accompanying drawings, in which:

Figure 1 is a front view of a machine for reproducing large drawings, engravings, blocks and the like in local circuit. Fig. 2 is a top plan view of same and Fig. 3 is an end elevation of same. Fig. 4 shows a fragmentary vertical cross-section of the receiving lathe. Fig. 5 is a fragmentary front view of same, the telephone carrier being raised. Fig. 6 shows diagrammatically the connection of the engraving telephones in parallel. Fig. 7 shows the connection of same in series. Figs. 8 and 9 are diagrammatical views showing the cylinder of the transmitter provided with means for constantly moistening the same with non-conducting liquid. Fig. 10 shows side and front views of the stylo of the transmitter combined with a supporting plate. Fig. 11 is a longitudinal cross-section of a receiving telephone equipped with the new diaphragm adjusting devices.

My improved machine is preferably formed of two slide-lathes, one of which carries the original drawing to be engraved on a metal surface or the like carried by the second lathe. On the carriage of the latter is arranged one or a plurality of telephone receivers, arranged in a line with each other, staggered or disposed in any other suitable way, so that the engravers' points attached to the diaphragms, are adapted to engrave on the metal surface. A machine of this kind is shown in Figs. 1 to 7. The two slide-lathes A and B may be arranged in a line and have their shafts coupled together, or they may be arranged one behind the other and connected together by means of a metallic belt *i* provided with holes, adapted to be engaged by projecting pins secured to the pulleys 2, 2 whereby the belt is prevented from sliding on the latter, and the movements of the two lathes are absolutely synchronous. It is manifest that the same result may be attained by any other means without departing from the scope of the invention.

The drawing, photograph or the like being printed with non-conducting ink on a metal foil, the latter is bent around and attached to a cylinder 3, capable of being arranged between the centers of the lathe A, hereinafter termed "transmitting lathe." The cylinder 3 is electrically insulated from the mass of the lathe. The carriage 4 of the latter has a smaller carriage 5 provided with a projecting arm to which a stylo 6 is attached. Said arm is electrically insulated and may be adjusted by a set-screw 7. The cylinder 3 is dipped into a trough 8 containing suitable non-conducting liquid for the purpose already described.

The carriage 9 of the lathe B, hereinafter termed "receiving lathe," is lengthened on each side so that its length corresponds to the greatest distance between the centers of the lathe. Between the centers of the latter is arranged the cylinder 10, on which the original is to be engraved. The carriage 9 carries at each end a semi-circular yoke 11, and to these yokes are secured longitudinal graduated bars 12, on which small carriages 13 may be adjusted, each of which carries a telephone receiver 14. Said bars 12 are adjustable on the semi-circular yokes 11, which are also graduated to this end, the bars being held in adjusted position by any suitable means such as set screws in the bars and engaging the yokes.

The diaphragm of each telephone receiver is provided with an engraver's point 15 equipped as already described and each telephone receiver may be adjusted radially (with respect to the cylinder 10) and by any suitable means—not shown—on its carriage 13, so that the work of each engraver's point 15 may be controlled.

The several telephone receivers may be connected in parallel (Fig. 6) or in series (Fig. 7) and are electrically connected on one hand to the stylo 6 of the transmitter lathe, and on the other hand to one terminal of a battery 16 (Figs. 6, 7), the second terminal of which is connected to a rubbing spring or the like 17 in contact with the transmitter's cylinder 3.

In this machine, the originals are reproduced by the variations of the current produced by the stylo which comes into contact with conducting and non-conducting places of the original, said variations being transmitted to the diaphragms of the telephone receivers in the well known manner.

If the carriage of the receiving lathe carries a single telephone receiver and the cylinder 10 is made of the same diameter as the cylinder 3 of the transmitting lathe, the original carried by the latter will be reproduced a single time and on the same scale on the cylinder 10. The carriages of both lathes are moved at the same speed in this case.

If it is desired to engrave drawings on cylinders for printing fabrics, wall-paper and the like and on which the same design is repeated several times, either staggered or in line, the carriage of the receiving lathe B will be provided with a number of telephone receivers 14 the number of which corresponds to the number of repetitions of the same original drawing to be engraved on the cylinder 10, said telephone receivers being arranged in line or staggered as desired. In this case, the cylinder 10 is made of a smaller diameter than the cylinder 3, and the original drawing will be reproduced on a smaller scale on the cylinder 10. Of course, the carriage 9 of the lathe B will be moved at a higher speed corresponding to the ratio of the reduction of the original.

In order to enable the cylinders 10 which in certain cases (cylinders for printing fabrics) are of a length of about 1 meter and of heavy weight, to be easily placed upon the lathe B and removed therefrom by means of a tackle block or the like, one of the semi-circular yokes 11 of the carriage of the lathe B is adapted to turn on a hinge 19 (Fig. 5), so that the complete equipment of said carriage may be raised as shown in Fig. 5. In this position, the cylinder 10 may be easily removed by means of a tackle block.

In order to prevent the stylo from being rapidly worn off on one hand by the frictional engagement with the metallic original, and on the other hand by the sparks produced between the stylo and the original at the break of current, the original and the stylo are constantly moistened at their contact with suitable non-conducting liquid (such as petroleum, benzin and the like). To this end, the cylinder or other carrier $a$ (Fig. 8) which carries the original to be transmitted or reproduced $b$, is dipped into non-conducting liquid contained in a trough $c$. Thus the liquid is constantly drawn away by the rotating cylinder and cleans the original and also holds it and the stylo $d$ in a good state.

For the trough $c$ I may substitute a reservoir $c'$ (Fig. 9) in which the cylinder $a$ and stylo $d$ or the complete transmitter are immersed.

Attached below the stylo $d$ (Fig. 10) is a resilient blade or plate $e$ made of non-conducting material, such as celluloid. During the transmission of an engraved block, said blade occupies the position shown in dotted lines and glides over the original, thus brushing the same before the stylo $d$, which extends slightly beyond the edge of the blade, comes into contact with the brushed places of the original. Another purpose of said blade $e$ is to prevent the stylo $d$ from dropping upon the bottom of the depressions or notches of the block (when the latter has deeply engraved places). In fact, said blade being too large, cannot drop itself into these depressions or notches and therefore supports the stylo and carries it over the same. By the arrangement of this blade $e$, the defects of the insulating layer with which the bottom of said depressions must be coated for enabling the block to be transmitted or reproduced, are no longer objectionable for the good transmission and the sharp reproduction of these blocks; in certain cases, said insulating layer may even be omitted completely, and an entirely metallic block without insulated places may be used as original.

In order to enable the receiving station to produce perfectly engraved metal (copper, steel) blocks, it is necessary to cause the diaphragm $f$ of the telephone receiver (Fig. 11) to which the engraver's point $g$ is attached, to receive sufficiently great and strong movements, and these movements must be produced in either direction as desired. To this end, the blade $h$ secured at one end to the engraver's point holder $i$ and at the other end at *j* to the casing of the telephone, has tendency to pull the diaphragm *f* in the direction of the arrow *k*. If the blade *h* is not attached to the point-holder *i*, its own resiliency brings it to the position shown in dotted lines. Resting against said blade *h* is a spring *m*, the pressure of which may be adjusted by a set-screw *n* as desired.

If strong movements of the engraver's point *g* in the direction of the arrow *k* are desired or required, the set-screw *n* is loosened so as to enable the blade *h* to pull the diaphragm *f* and point *g* with the entire force in the direction of the arrow *k*, as soon as the current does not flow through the electro-magnet of the telephone receiver. On the contrary, if strong movements of the point *g* in opposite directions are required, the set-screw *n* will be tightened so as to compensate the resiliency of the blade *h* and enable the electro-magnet to strongly attract the diaphragm *f* when current flows through the same. This equipment of the engraver's point is of great importance and highly conducive to the production of sharp and deep engravings corresponding in all respects to the respective originals.

Having fully described my invention, what I claim and desire to secure by Letters Patent is:—

1. In transmitting station apparatus for distance transmission, a stylo record and an original record, means for moving both records, and dust-collecting tanks, one adjacent the stylo record and the other adjacent the original record, each for containing non-conducting liquid into which the corresponding record will dip, while in motion, for continuously moistening both records with non-conducting liquid.

2. In an apparatus employed in distance transmission, a transmitter stylo and a resilient plate non-conductively connected with said stylo, and broader than usual deep depressions in an original record, for brushing said original during transmission.

3. In an apparatus employed in distance transmission, a telephone receiver having a magnet, a diaphragm located near said magnet, a spring normally tending to move said diaphragm away from said magnet, an oppositely-acting spring normally resting against that first-named, and a set screw for adjusting the pressure of the second-named spring against that first-named.

4. In an apparatus employed in distance transmission, a telephone receiver having a magnet, a diaphragm located near said magnet, a spring tending to move said diaphragm away from said magnet, a second spring tending to resist the action of that first named upon said diaphragm, and means for adjusting the resistance of the second-mentioned spring.

In testimony whereof, I have signed my name to this specification in the presence of two subscribing witnesses.

HENRI CARBONNELLE.

Witnesses:
RODOLPHE SANDHOY,
GREGORY PHELAN.